Figure 1:
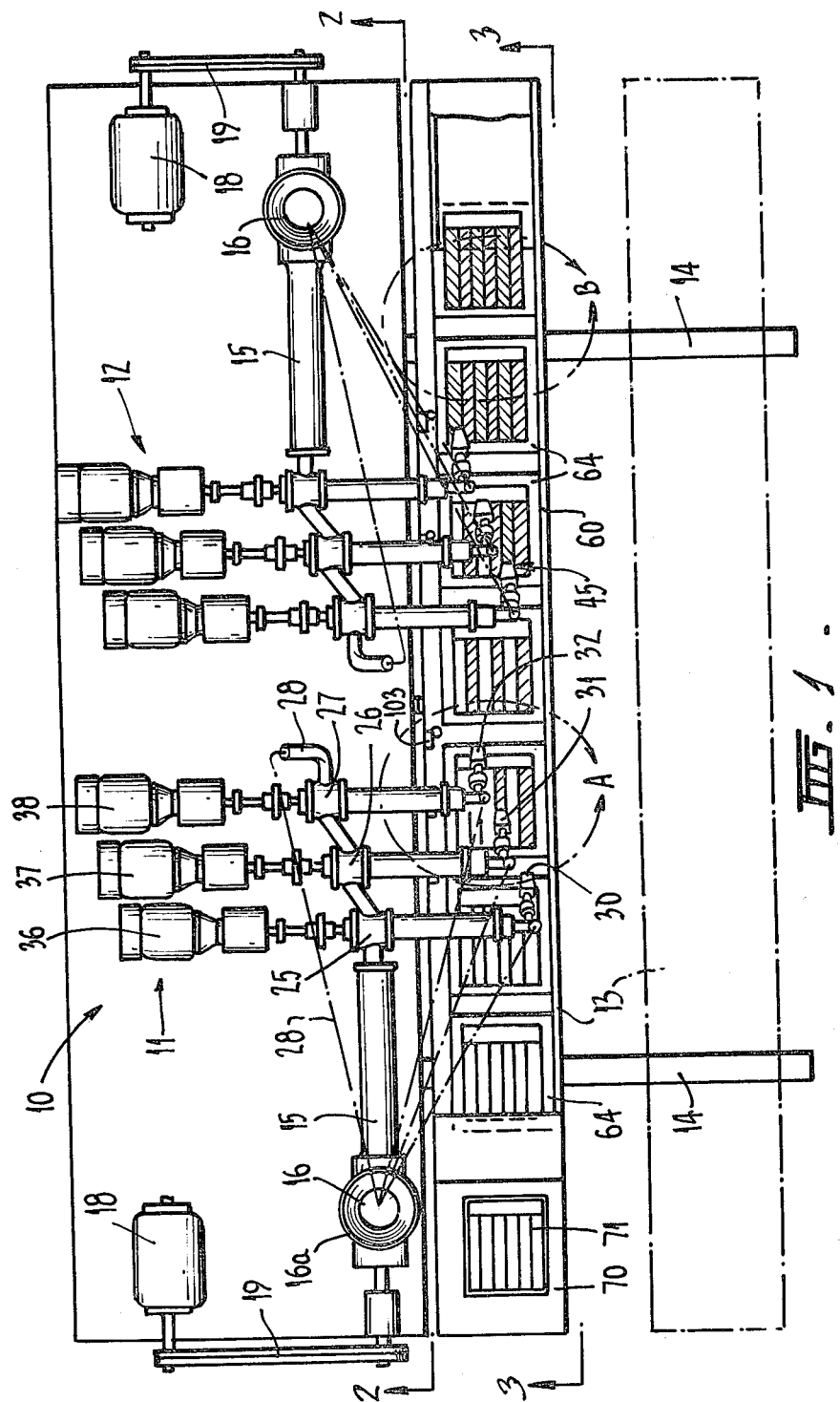

United States Patent [19]

McDowall et al.

[11] 4,307,758

[45] Dec. 29, 1981

[54] METHOD AND APPARATUS FOR APPLYING PASTE TO BATTERY GRIDS

[75] Inventors: William L. McDowall, Glen Waverley; Alan K. Maplesden, Kew; Trevor W. North, Noble Park; Erich Kaufmann, Bayswater, all of Australia

[73] Assignee: Dunlop Australia Limited, Melbourne, Australia

[21] Appl. No.: 91,790

[22] Filed: Nov. 6, 1979

[30] Foreign Application Priority Data

Nov. 6, 1978 [AU] Australia .............................. PD6662

[51] Int. Cl.³ ............................................. H01M 4/82
[52] U.S. Cl. ....................................... 141/1.1; 141/32; 141/103; 141/134; 222/318; 425/120

[58] Field of Search ...................... 141/1.1, 9, 32, 33, 141/78, 80, 103, 125, 131, 134, 156–159, 231, 232, 234, 280, 324, 325, 392; 222/255, 318; 425/120, 570

[56] References Cited

U.S. PATENT DOCUMENTS

| 2,555,301 | 6/1951 | Chubb ................................. 141/1.1 |
| 3,949,793 | 4/1976 | Peters et al. ...................... 141/32 X |
| 4,050,482 | 9/1977 | Ching et al. ...................... 141/32 X |

Primary Examiner—Frederick R. Schmidt
Attorney, Agent, or Firm—Schuyler, Banner, Birch, McKie & Beckett

[57] ABSTRACT

A method and apparatus for applying paste to battery grids wherein the paste is circulated in a primary circuit incorporating an open reservoir wherein the paste is relieved of all pumping pressure and portion of the paste is diverted from the primary circuit into a secondary circuit for delivery to a nozzle which may be selectively opened and closed to deliver paste to the grid, the secondary circuit also incorporates the open reservoir.

9 Claims, 6 Drawing Figures

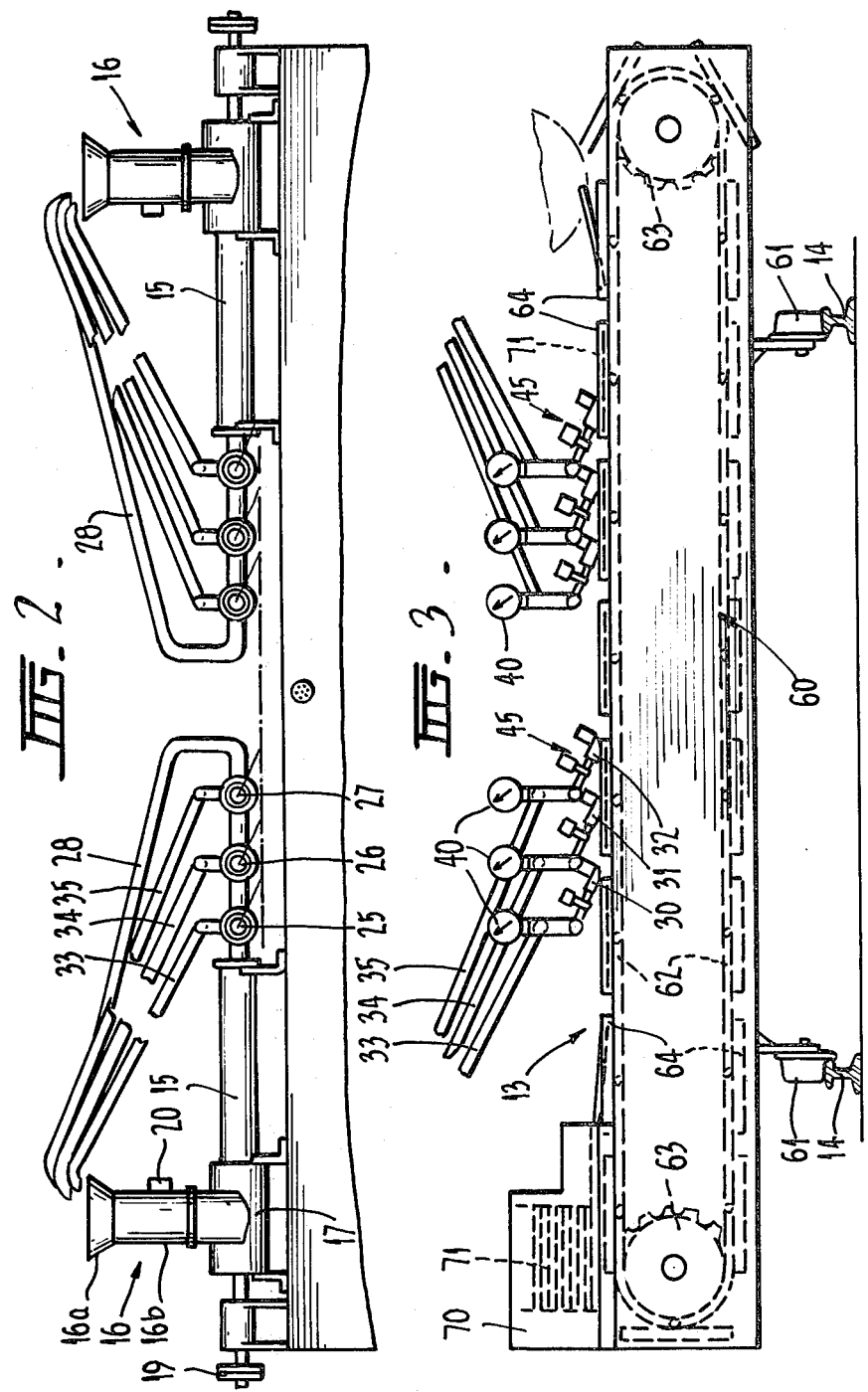

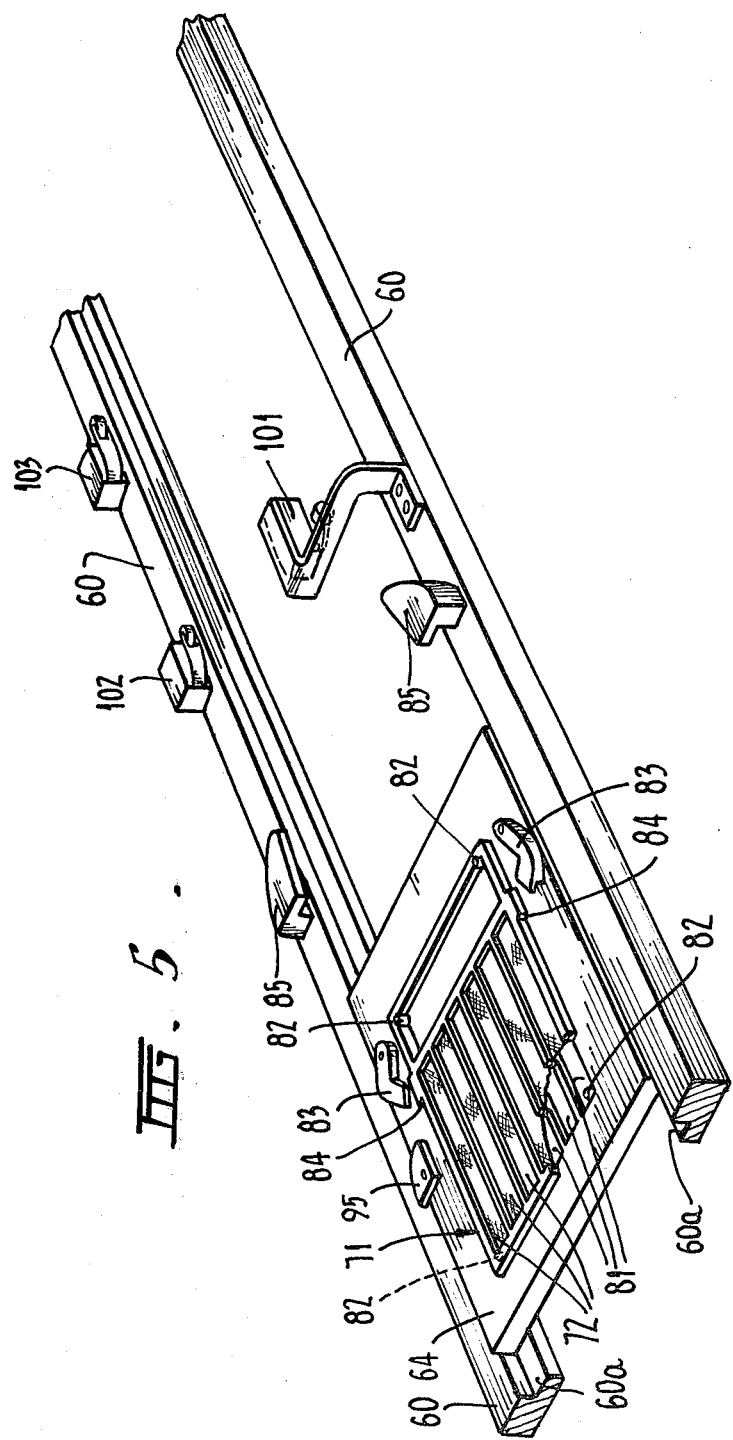

METHOD AND APPARATUS FOR APPLYING PASTE TO BATTERY GRIDS

This invention relates to a method and apparatus for applying paste to grids for use in batteries, and in particular secondary batteries.

The present invention has been developed for the purpose of pasting battery grids as incorporated in batteries constructed in accordance with Australian Pat. No. 488,272 however, the same method and apparatus is applicable to pasting of battery grids in conventional batteries and batteries of other constructions, and thus the invention is not limited to the manufacture of grids for batteries in accordance with the above Australian Patent.

The current general practice is to extrude paste material from a hopper into a strip which is applied to a battery grid and subsequently pressed thereinto. The extruded strip may be of a continuous nature or subsequently cut to a length corresponding to the dimensions of the battery grid. The general state of the art of pasting battery grids is summarised in the specification of U.S. Pat. No. 3,859,135 assigned to Joseph Lucas Industries Limited. In the prior art and the invention discussed in the Lucas patent, the paste material is of a consistency that will enable it to be extruded from an open hopper under the weight of the paste material within the hopper. This technique has the limitation that the speed of application of the paste to the grid is determined by the rate of gravity flow of the paste from the hopper. As the consistency of the paste must be controlled so that there is not an excess of moisture, which will result in undue shrinkage during subsequent drying, there is a clear upper limit on the speed of which pasting may be carried out under this gravity flow system.

There is disclosed in U.S. Pat. No. 3,814,628 assigned to Gates Rubber Company, a method of applying paste to battery grids wherein the paste is pumped through a closed loop circuit, and paste is diverted from this circuit by a second pump for application to the grid. So far as is known, this method has not been used in practise and would have the disadvantage that the physical properties of the paste change substantially when subjected to circulation under pressure in a closed system. It has been found that under those conditions the moisture will separate out, with the result that the paste becomes dry and tends to create blockages in the system, and when applied to the grid is not sufficiently flowable to provide a uniform layer of paste on the grid or to adequately penetrate the grid matrix.

The object of the present invention is to provide a method and apparatus for applying paste to battery grids which will permit relatively high production rates with a minimum of wastage of paste material, and a minimum of subsequent cleaning or other work preparatory to subsequent assembly of the grids to form cells.

With the above object in view there is provided a method of applying paste to a battery grid comprising circulating the paste in a primary circuit, diverting paste from the primary circuit into a secondary circuit, and periodically diverting paste from said secondary circuit to a nozzle for delivery to a battery grid.

Conveniently the secondary circuit is initiated from the primary circuit and also terminates in the primary circuit, thus being in effect, a by-pass in respect of portion of the primary circuit. Preferably there are pluralities of secondary circuits diverting paste from a common primary circuit and delivering the paste to respective nozzles. Each nozzle may be arranged to deliver paste to different areas of the same grid or to respective grids.

When applying paste to a grid frame of the type disclosed in the aforesaid Australian Patent, having a plurality of independent paste receiving areas arranged in side by side relationship across the width of the frame, a separate secondary circuit and nozzle is provided to deliver paste into each receiving area of the frame.

In this type of frame alternate receiving areas are pasted with active material of opposite polarity and there is thus provided independent primary circuits for positive and negative paste respectively, and a plurality of secondary circuits and nozzles for each primary circuit.

The respective nozzles for delivering positive and negative paste material are disposed so that each frame may move in a path beneath the nozzles and in sequence receive paste material of appropriate polarity in the respective receiving areas of the frame. Conveniently the delivery of paste material from the respective nozzles is controlled in accordance with the movement of the frame along the path, and the movement of the frame may activate controls which open and close the nozzles in sequence as the frame passes therebelow.

Conveniently the axis of the nozzles through which the paste is delivered onto a battery grid is inclined to the plane of the grid at an angle between 15° and 25°, preferably 20°, the delivery end of the nozzle is preferably formed in a surface at right angles to the axis of the nozzle. Conveniently the grid is moved in the plane thereof relative to the nozzle so that the paste issuing from the nozzle is laid in the form of a strip onto the grid. In some applications of the method it may be preferable to move the nozzle relative to the grid.

The flow of paste from the nozzle is controlled in time relation to the relative movement between the nozzle and the grid to achieve the depositing of the paste at the desired location on the grid. The control of the paste flow may be effected by a blade member, movable in a plane at right angles to the axis of the nozzle, to selectively open and close the delivery end of the nozzle. The control of the movement of the blade member may be in response to the relative movement between the nozzle and the grid.

Also in accordance with the above stated object there is provided in an apparatus for applying paste to battery grids, a primary paste pump arranged to circulate paste in a primary circuit, at least one secondary pump arranged to divert paste from the primary circuit to a secondary circuit, a nozzle in combination with said secondary circuit, and means to selectively open and close said nozzle to deliver paste from the secondary circuit to a battery grid.

Conveniently the apparatus includes a plurality of secondary pumps arranged to divert paste from the same primary circuit, each secondary pump delivering to a respective nozzle.

The nozzle or nozzles may be arranged and operated in accordance with the previously described method for delivering paste onto the battery grids.

In one preferred form the apparatus comprises a pump assembly incorporating the primary and secondary pumps and associated respective circuits and nozzles as described above, and a conveyor assembly arranged to pass battery grids beneath a plurality of nozzles so that paste is deposited onto the grids by the respective nozzles at the desired location as the grids passed the nozzles. The conveyor assembly is preferably a unit, independent of the pump assembly, and is movable relative thereto to a position wherein the conveyor assembly is completely clear of the nozzles so as to facilitate cleaning and maintenance of the nozzles, pumps and conveyor respectively.

Figure 4:
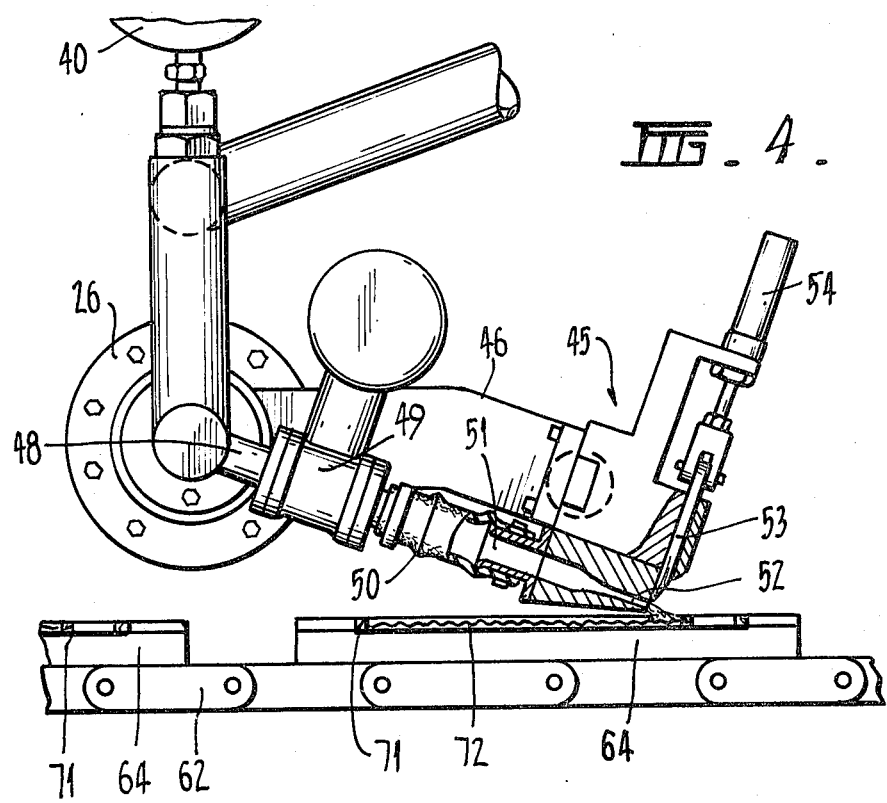

The invention will be more readily understood from the following description of one practical arrangement of an apparatus for applying paste to battery grids in accordance with the method of the present invention. The apparatus is illustrated in the accompanying drawings wherein:

FIG. 1 is a plan view of the apparatus,

FIG. 2 is a side view of the pump portion of the apparatus taken along a section line 2—2 in FIG. 1, FIG. 3 is a side view of the conveyor part of the apparatus taken along line 3—3 in FIG. 1, FIG. 4 is an enlarged view partly in cross-section of portion of the secondary paste circuit and an associated delivery nozzle applying paste to a battery grid, FIG. 5 is a perspective view of the portion of the conveyor in the area A as indicated in FIG. 1.

Figure 5A:
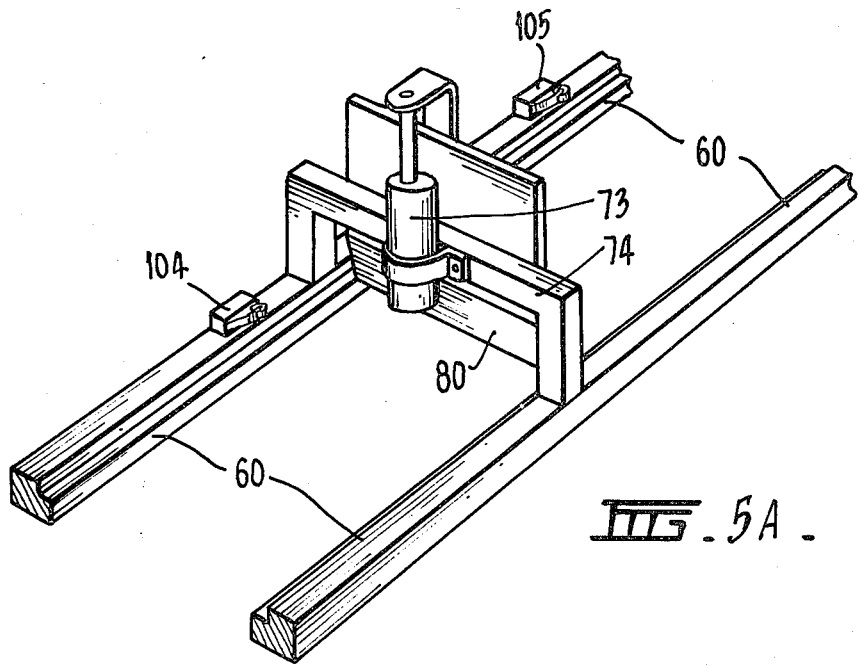

FIG. 5A is a perspective view of a further portion of the conveyor in the areas B as indicated in FIG. 1.

Referring now to FIG. 1, the apparatus comprises two basic portions, a pump assembly 10 incorporating positive and negative paste pump units 11 and 12, and a conveyor assembly 13. The pump assembly is a stationary structure which may be permanently mounted to a floor, whilst the conveyor assembly 13 is supported on a pair of rails 14, attached in a fixed relationship to the pump assembly 10. In FIG. 1 the conveyor assembly is shown in full outline in its operating relationship to the pump assembly 10, and the conveyor assembly 13 may be moved forwardly on the rails 14, to the position shown diagrammatically in broken outline, so that it is spaced a substantial difference from the pump assembly 10. The ability to move the conveyor assembly 13 relative to the pump assembly 10 is provided principally to facilitate cleaning of the apparatus as cleanliness of paste applying equipment is a prime requirement. Also the ability to provide a clear space between the pump assembly 10 and the conveyor assembly 13 greatly facilitates maintenance of the apparatus.

The pump units 11 and 12 are of identical construction and accordingly we shall now describe in detail the pump unit 11, however it is to be understod that pump unit 12 is of identical construction.

The primary pump 15 is of the axial type and receives battery paste from the feed hopper 16, through a feed chamber 17 housing a feed screw (not shown), the pump 15 and feed screw being arranged co-axially and driven by the motor 18 through the drive 19. The hopper 16 has an enlarged open mouth portion 16a feeding into a substantially cylindrical portion 16b communicating with the feed screw chamber 17. The vibration inducing device 20 is fitted to the cylindrical portion 16b of the hopper, and is activated whenever the primary pump is running to promote the flow of the paste material downwardly through the hopper 16.

The primary paste pump 15 delivers simultaneously to the three secondary paste pumps 25, 26 and 27, and the excess of paste delivered by the primary pump is returned to the mouth 16a of the hopper 16 via the conduit 28. Each of the secondary pumps 25, 26 and 27 diverts paste from the circuit of the primary pump into a secondary paste circuit, from which paste is delivered to respective nozzles 30, 31 and 32. The excess paste from the respective secondary pumps being again returned to the mouth portion 16a of the feed hopper 16 by respective conduits 33, 34 and 35.

Because of the nature of battery paste material it is not desirable for a significant mass of the paste material to remain stationary in a pumping system. Accordingly in the present apparatus the primary and each of the secondary pumps returns the excess paste material back to the feed hopper 16, wherein the paste is fully relieved from the pressure of the pumping circuit. Further the excess material from each circuit is intermixed with the aid of the vibrator device 20 so that the paste material tends to maintain the required paste consistency and other physical properties.

Each of the secondary pumps 25, 26 and 27 are driven by respective variable speed motors 36, 37 and 38, and whilst the pasting apparatus is in operation, the primary pump 15 and each of the secondary pumps 25, 26 and 27 operate continuously, the dispensing of the paste material onto the grid is controlled by the dispensing nozzle as described hereinafter. The speed of the individual secondary motors is adjusted to maintain the required rate of delivery at the respective nozzles. Each secondary circuit is provided with a pressure gauge 40 at a location in the close proximity to the dispensing nozzle as a convenient indicator of the consistency of the paste flowing in that circuit.

Referring now to FIG. 4 of the drawings, each nozzle assembly 45 is detachably mounted on an arm 46 secured to and projecting from the respective secondary pump 26. A dispensing nozzle assembly 45 as shown in FIG. 4 is mounted on each of the secondary pumps as can be seen in FIGS. 1 and 2. The nozzle assembly 45 communicates with the delivery side of the secondary pump 26 via the branch conduit 48, the pneumatically actuated control valve 49 and the detachable flexible conduit 50. The flexible conduit 50 is clamped by suitable clips to the extension 51 of the nozzle assembly and the control valve 49, so that the clips may be released to permit convenient removal of the nozzle assembly 45, particularly for the purposes of cleaning. The control valve 49 is pneumatically operated with the air supply controlled by a solenoid valve. The control valve 49 is preferably also manually operable. The manual operation is provided so that each control valve may be closed if required for maintenance purposes or setting up of the nozzle assembly.

The solenoid operation of the valve is controlled by the position of the conveyor assembly relative to the pump assembly so that when the conveyor assembly is in the correct operating relationship to the pump assembly and running, the solenoid will open the control valve 49 which is otherwise closed.

The nozzle assembly 45 has a discharge aperture 52 of a width proportional to the width of the paste receiving area of the grid frame.

The aperture 52 is preferably of a dumb-bell cross-section to prevent coiling of the strip of paste as it issues. Also the aperture is narrower than the width of the paste receiving area to allow for spreading of the paste during the subsequent vibration treatment.

The aperture 52 is selectively opened and closed by the sliding gate 53 which is actuated by the pneumatic cylinder 54. The operation of the pneumatic cylinder 54 is controlled by the position of the grid frame on the conveyor to initiate and terminate the discharge of paste through the nozzle onto the frame, as will be described in more detail hereinafter.

The conveyor assembly 13 comprises a main frame 60 supported on wheels 61 which run on the rails 14. The endless chain 62 is supported on respective sprocket assemblies 63, mounted at the opposite ends of the main frame. The endless chain has mounted thereon a plurality of frame support plates 64, each pivotally connected to the chain to facilitate the travel of the plates around the respective sprockets. Along the upper flight of the chain the frame support plates 64 are supported on their opposite edges on respective slide surfaces 60a forming part of the main frame 60. The support plates are thus positively supported so that the relationship of the grid frames, supported on the plates, relative to the paste dispensing nozzles 45 is positively controlled.

As seen at the lefthand end of the conveyor unit 13 in FIG. 3, a magazine 70 is provided to hold a store of grid frames 71, and as each plate 64 on the endless conveyor passes beneath the magazine 70, a grid frame is withdrawn from the magazine onto the plate so as to then be carried forward along the top flight of the conveyor beneath the paste dispensing nozzles 45.

Each frame support plate 64 has six recesses 81 in the upper face thereof which align with the paste receiving areas 72 of the grid frame when it is positioned on the support plate. The recesses 81 ensure that when paste is applied to the frame it will not contact the support plate, as this would result in a progressive build up of paste on the support plate and interfere with the operation of the apparatus. Locating pins 82 are provided in the support plate 64 to co-operate with selecting locations on the grid frame so as to ensure the correct location of the grid frame relative to the recesses 81 in the support plate. The hold-down latches 83 are pivoted to the support plate 64 to co-operate with lugs 84 on each grid frame 71 to prevent the lifting of the grid frame during the passage of the support plates beneath the pasting nozzles 45. The hold-down latches 83 are moved into and out of engagement with the lugs on the grid frame by cams 85, appropriately located along the length of the top flight of the conveyor.

Supported on the conveyor main frame 60 are a group of three pilot switches for each dispensing nozzle 45. The groups of switches are spaced in the direction of travel of the support plates 64, and each group controls the operation of a respective dispensing nozzle 45 to deliver paste therefrom when the grid frame is correctly located with respect to the particular dispensing nozzle.

One group of pilot switches are illustrated in FIG. 5 comprising switches 101, 102 and 103. The support plate 64 passes beneath the pilot switch 101 and if a grid frame 71 is in position on the support plate it will trip pilot switch 101 which results in the energising of pilot switch 102. As the support plate 64 continues to advance the cam 95 attached to the plate 64 trips the pilot switch 102 which activates a valve to admit air to cylinder 54 to open the gate 53.

In the event that a grid frame is not in position on the support plate then switch 102 will not be energised as switch 101 was not tripped, and hence even though switch 102 is tripped by the cam 95 the valve controlling cylinder 54 will not be activated and the gate 53 will remain closed.

As the support plate advances further the cam 95 will trip pilot switch 103 which activates the valve to admit air to the cylinder 54 to close the gate 53. Further movement of the support plate and grid frame will result in the same sequence of operations being effected as the support plate passes each group of switches, and thus each nozzle is operated in sequence to deposit paste onto the grid frame.

It will be appreciated that the pilot switches 102 and 103 are positioned so that the opening and closing of the gate 53 is effected at the required location on the grid frame carried by the support plate.

The vibration horn 80 is supported on the main frame 60 of the conveyor assembly downstream, in respect of the direction of travel of the conveyor, of the final pasting nozzle of the pump unit 12. The horn 80 is supported on the frame 74 attached to the main frame 60 of the conveyor unit, and is raised and lowered relative to the support plates 64 passing therebeneath by the pneumatic cylinder 73. The raising and lowering of the horn is effected in timed relationship to the movement of the grid frames 71, so that the horn is lowered to contact the frame in the vicinity of where the paste in the frame commences, and then remains in contact with the frame while it passes beneath the horn until the end of the extent of paste is reached, whereupon the horn is raised clear of the frame again. This lowering and raising of the horn is controlled by pilot switches 104 and 105 positioned along the path of the moving support plates 64 being operated by the cam 95 attached to each support plate.

The operation of the complete apparatus will now be briefly described.

A supply of positive battery paste is placed in the hopper of pump unit 11, and a supply of negative paste in the hopper of pump unit 12. The respective primary pump units are switched on so that paste is circulated from the primary pumps 15 through the conduits 28 and returned to the hopper 16. The groups of secondary pumps are also started so that a proportion of the paste being delivered by the respective primary pumps is diverted into the secondary pump circuits to be supplied to the respective nozzles 45. There should be a short delay from the starting of the primary pump before the secondary pumps are started to ensure that the primary circuit is fully charged with paste material. The excess material being again returned to the hopper 16 by the respective return conduits. At the initial switch on period, the control valve 49 associated with each paste dispensing nozzle 45 will be in the closed position, and the respective nozzle gates 53 will also be closed.

The conveyor assembly 13 is positioned adjacent the pump assembly 10 and locked in that position by suitable mechanisms associated with the conveyor assembly and its supporting track 14. There are also provided various interlocks between the conveyor assembly and the pump assembly so that the dispensing of paste from the nozzles 45 can only take place when the conveyor assembly is in the correct operating relationship to the nozzles.

With a suitable supply of grid frames in the magazine 70, the conveyor 62 is set in motion and each support plate 64 receives a grid frame in the required location as it passes beneath the magazine. The grid frames are correctly located and locked in position on the support plate 64 by the locating pins 82 and latches 83 previously described.

As each support plate 64 advances from the magazine towards the first dispensing nozzle 45 with the grid frame positioned thereon, the grid frame activates the frame sensor pilot switch 101 to indicate that a frame is correctly positioned on the support plate, and the signal from the sensor energises the pilot switches 102 located on the conveyor main frame 60 along the path of the support plate. The switches 102 and 103 operate the valve regulating the admission of the air to the pneumatic cylinder 54 to open and close the gate 53 as previously described. The cam 95 attached to the support plate 64 first trips pilot switch 102 which activates the valve so that air is admitted to the pneumatic cylinder 54 to raise the gate 53 and open the nozzle aperture 52, whereupon paste is delivered from the relevant secondary circuit onto the receiving area of the grid frame. The paste continues to be delivered onto the grid frame as it moves beneath the nozzle 45 until the cam 95 trips the switch 103, which then supplies air to the cylinder 54 to close the gate 53 and terminates the delivery of paste onto the paste receiving area of the frame.

Each of the secondary pumps operates continuously so that upon the closing of the gate 53, the paste being delivered by the secondary pump 26 will be by-passed back to the hopper via conduit 34. It will also be appreciated that whilst the gate 53 is open, and paste is being delivered onto the grid frame, there will also be a proportion of the paste delivered by the pump 26 being by-passed through the conduit 34 back to the hopper 16.

Each of the dispensing nozzles 45 are operated as above described in sequence so that three strips of positive battery material are placed in alternate receiving areas across the width of the grid frame 71, and then three strips of negative paste material are deposited in the remaining three receiving areas. Thereafter as the frames continue along the conveyor, the ultrasonic vibration horn 80 lowers into engagement with the grid frame 71 as previously described, and subjects the paste to vibration so the paste penetrates through the mesh in the frame and forms a layer of comparatively even thickness paste material in each receiving area. Thereafter the frames are released from the support plates and stored or transported for further processing in the manufacture of the final battery.

Although the apparatus illustrated in the drawings is specifically constructed for applying paste to grid frames of the novel battery disclosed in Australian Patent No. 488,272 those skilled in the art will appreciate that the arrangement of the nozzles may be varied to suit other constructions of battery grid. Where each grid only receives paste of one polarity there is only required one pump unit with one primary pump and one or more secondary pumps.

The principal feature of the method of applying battery paste disclosed herein is that the paste is extruded under forced pressure so that a high production rate is possible. However the paste is not confined in a closed circuit, and continually under pressure, and hence the physical properties of the paste are maintained.

We claim:

1. A method of applying paste to a battery grid comprising circulating paste in a primary circuit, diverting the paste from a primary circuit into a secondary circuit, selectively diverting a quantity of paste from the secondary circuit through a nozzle, passing battery grids in sequence beneath the nozzle and timing the diversion of the paste through the nozzle relative to the passage of the grid beneath the nozzle to deliver the quantity of paste onto a predetermined area of each grid as it passes beneath the nozzle.

2. A method as claimed in claim 1 wherein said primary circuit initiates and terminates at a paste reservoir, and said secondary circuit also terminating at said paste reservoir.

3. A method according to claim 1 wherein paste is independently diverted from the secondary circuit to a plurality of nozzles, and paste is selectively dispensed from each nozzle onto independent areas of the battery grid.

4. A method of applying paste to a battery grid comprising drawing paste from a paste reservoir by a primary pump, circulating paste by said primary pump through a primary circuit terminating at said reservoir, diverting paste from said primary circuit by a secondary pump into a secondary circuit terminating at said reservoir, independently diverting paste from said secondary circuit through a plurality of nozzles for delivery to a battery grid, passing battery grids in sequence beneath the nozzles and timing the diversion of the paste through the nozzles relative to the passage of the grid beneath the nozzles to selected predetermined areas of each battery grid as it passes between the nozzles.

5. A method according to claim 4 wherein a plurality of battery grids are moved in succession along a predetermined path, and said nozzles are spaced in the direction of said path, and transversely of the path, the selective dispensing of paste from said nozzles being controlled to dispense transversely spaced strips of paste to each battery grid as the grid moves along the predetermined path.

6. In apparatus for applying paste to battery grids: a primary paste pump arranged to circulate paste in a primary circuit, at least one secondary pump arranged to divert paste from the primary circuit to a secondary circuit, at least one nozzle means in paste receiving communication with said secondary circuit, and means operable to control the dispensing of a quantity of paste from said nozzle means, conveyor means to carry battery grids in sequence beneath said nozzle means, and means to regulate the operation of the control means in response to the dispensing of paste through the nozzle means relative to the passing of the grids there beneath so a measured quantity of paste is delivered for said nozzle means onto a predetermined area of each grid as said grid passes beneath said nozzle means.

7. In apparatus as claimed in claim 6 wherein said primary circuit incorporates a reservoir, and said secondary circuit terminates at said reservoir.

8. In apparatus for applying paste to a battery grid, a paste reservoir, a primary paste pump arranged to circulate paste in a primary circuit incorporating said reservoir, at least one secondary paste pump arranged to divert paste from the primary circuit into a respective secondary circuit terminating at said reservoir, and a plurality of nozzles communicating with said secondary circuit, a conveyor arranged to support a plurality of battery grids and operable to move each grid in sequence beneath each nozzle, and means to selectively open and close each nozzle in response to the movement of the grid beneath the respective nozzles to deliver paste from the secondary circuit to selected predetermined areas of the battery grid.

9. In apparatus as claimed in claim 8 further having said paste reservoir open to ambient pressure, a primary paste pump arranged to receive paste from the reservoir and circulate the paste through a primary circuit terminating at said reservoir, and a plurality of secondary pumps each arranged to divert paste from the primary circuit into respective secondary circuits each terminating at the reservoir, and respective nozzles.

* * * * *